United States Patent

[11] 3,601,708

| [72] | Inventors | Samuel Stempler<br>Brooklyn;<br>Carl A. Listl, New Hyde Park; Eugene L.<br>Boronow, Jamaica, all of, N.Y. |
|---|---|---|
| [21] | Appl. No. | 11,387 |
| [22] | Filed | Feb. 16, 1970 |
| [45] | Patented | Aug. 24, 1971 |
| [73] | Assignee | Kollsman Instrument Corporation<br>Syosset, N.Y. |

[54] FREQUENCY INDEPENDENT CONSTANT PHASE SHIFT SYSTEM
4 Claims, 5 Drawing Figs.

[52] U.S. Cl. .................................................. 328/155,
307/228, 328/133, 307/229, 307/232, 307/235,
307/263, 307/295
[51] Int. Cl. .................................................. H03b 3/04
[50] Field of Search .......................................... 328/155,
140, 133, 55, 109; 307/232, 265, 295, 235, 263,
228, 229

[56] References Cited
UNITED STATES PATENTS

| 3,056,047 | 9/1962 | Cooke-Yarborough | 307/295 X |
| 3,303,359 | 2/1967 | Des Brisay, Jr. | 307/263 |
| 3,484,624 | 12/1969 | Rasiel et al. | 307/265 |
| 3,510,786 | 5/1970 | Paulson | 328/155 |
| 3,521,084 | 7/1970 | Jones | 328/133 X |

Primary Examiner—Stanley T. Krawczewicz
Attorneys—E. Manning Giles, J. Patrick Cagney, Peter S. Lucyshyn and Richard G. Kinney ABSTRACT: The system provides phase alignment of a pair of frequency variable symmetrical pulsations of repetitive waveform having the same instantaneous frequency. Facility is described and illustrated for comparing the relative phase of the two-wave trains and for phase shifting one of the wave trains relative to the other. The phase shift is adjustable over a broad range and once the phase shift is set, the set remains constant and independent of changes in the frequency of the wave trains.

3,601,708

INVENTORS
Samuel Stempler
Carl A. Listl
Eugene L. Boronow
BY J. Patrick Cagney
ATTY.

3,601,708

FREQUENCY INDEPENDENT CONSTANT PHASE SHIFT SYSTEM

This invention relates to a system for phase aligning symmetrical wave trains having sharp rise and fall times and having the same instantaneous frequency. To facilitate disclosure, square or rectangular wave trains are referred to herein but such reference shall be understood as including other wave forms characterized by sharp rise and fall lines. In accordance with the present invention, an arrangement is provided for receiving one of the wave trains and for producing a pulse signal corresponding to each voltage level transition of the received wave train. Facilities are provided for supplying to a ramp generator a voltage having an amplitude proportional to the instantaneous frequency of the wave train. A switch, responsive to each of the pulse signals, is connected to the ramp generator means to initiate a corresponding output voltage ramp signal having a slope proportional to the instantaneous frequency. A comparator unit responds to the ramp signal and to an adjustable reference voltage level for initiating a control signal when the ramp signal exceeds the reference voltage level. The above switch responds to the control signal to reset the ramp generator means. An arrangement is provided which responds to successive control signals for producing a square voltage wave having voltage level transitions synchronized with the control signals.

Thus, by adjusting the reference voltage the waves of one of the trains can be shifted a fixed amount of phase. This phase shift is adjustable over a broad range and, once set, remains constant and independent of changes in the frequency of the waveform. The system exhibits high speed of response, high accuracy in setting, ease of setting, and stability of the constant phase shift setting.

The system is useful wherever a constant shift is required even when the signal frequency can change. Particular applications include coding and decoding systems and phase shift compensation.

DESCRIPTION OF THE PREFERRED EMBODIMENT

Figure 1:
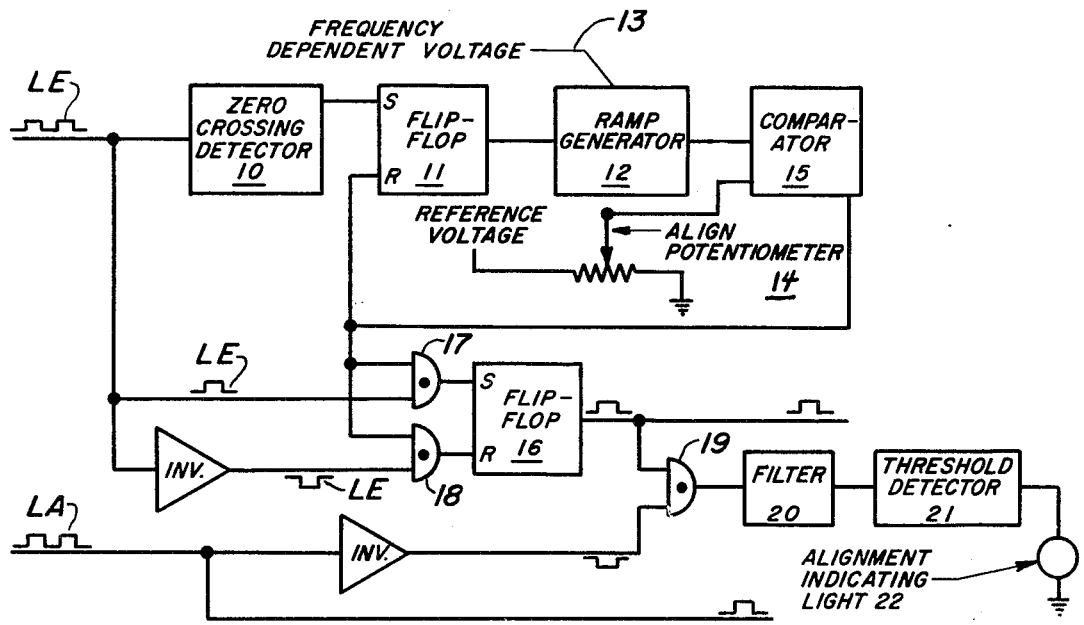
FIG. 1 is a schematic and functional diagram of a system for phase aligning a pair of symmetrical wave trains having the same instantaneous frequency in accordance with the present invention.

Referring now to the drawings, and specifically to FIG. 1, there is shown a schematic and functional diagram of a system for phase aligning a pair of symmetrical square waves in accordance with the present invention.

Briefly, the leading of the two wave trains which are to be aligned, hereinafter referred to as LE, drives a zero-crossing detector 10. As will be explained below, the detector outputs a pulse train of negative spike pulses, each pulse corresponding to a voltage level transition "T" of the input square wave LE (as has been shown in the timing diagram of FIG. 5). The output from the zero-crossing detector 10 then enters the "set" input of flip-flop 11. Every pulse from the zero-crossing detector 10 causes the output of flip-flop 11 to be brought to the logical "1" state (see FIG. 5) which, in turn, causes the ramp generator 12 to receive voltage along line 13 having an amplitude proportional to the instantaneous frequency of the two square waves. The ramp generator 12 then charges linearly to provide a negative-going voltage ramp having a slope $s$ which is proportional to the voltage along line 13 (FIG. 5), until it reaches a voltage equal in magnitude to that determined by the alignment potentiometer 14. At this time, the output of comparator 15 changes to the logical "1" providing a control signal (FIG. 5) which causes:

1. The flip-flop 16 to be set or reset depending upon whether the present state of the leading phase signal LE is "1" or a "0" respectively. Thus, the output of flip-flop 16 is a square wave having voltage level transitions in synchronization with successive control signals. Such is accomplished by providing a pair of logic "and" gates 17, 18 which respectively drive the "set" and "reset" inputs of flip-flop 16. As shown, gate 17 has, as its inputs, the leading phase signal LE and the output of comparator 15. Gate 18 has, as its inputs, the inversion of the leading phase signal LE and the output of the comparator 15; and
2. The flip-flop 11 to be reset, which in turn causes the ramp generator 12 to be cut off from the frequency-dependent voltage of line 13 thereby causing ramp generator 12 and comparator 15 to return to their normal states in preparation of receipt of the next voltage transition "T" of the leading phase signal LE to the zero-crossing detector 10.

Figure 5:
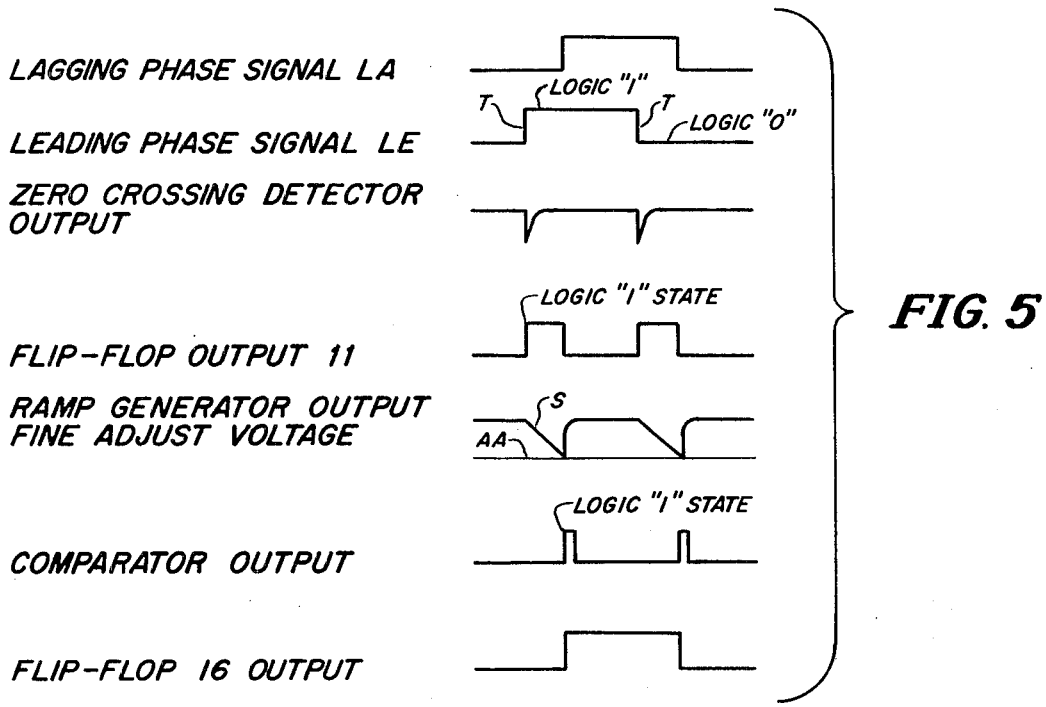
FIG. 5 is a timing diagram illustrating the functions of the zero-crossing detector, ramp generator and comparator units.

Referring to FIG. 5, it will be apparent that the output of the comparator consists of a series of successive pulses or control signals and that by adjusting the reference voltage level 14A through use of the alignment potentiometer 14, the duration between the time that the zero-crossing detector 10 provides an impulse signal and the time at which comparator 15 changes state to produce a control signal can be controlled. Thus, the leading phase signal LE can be phase delayed to the extent necessary to provide alignment with the lagging phase signal LA.

In order to determine the necessary adjustment of potentiometer 14, the square wave output of the output flip-flop 16 (i.e., the compensated LE square wave) and the inversion of the lagging square wave train LA are logically combined by the "and" gate 19, which provides a logical differencing operation to produce a pulse train having pulses, the duty cycle of which are proportional to the phase shift between the two wave trains. The average value of the logical "and" combination of the LA and compensated LE wave trains is also proportional to the phase shift and is found by passing that signal through a low-pass filter 20. The output of the filter 20 is then sent to a threshold detector 21, as shown. Should the signal from the filter 20 exceed the threshold in the detector 21, power is applied to the alignment indicating light 22. Thus, when the indicator light 22 is on, it indicates that the two wave trains have not been fully compensated for phase misalignment. The potentiometer 14 is then adjusted until the relative phase shift between the two has been reduced to zero, as indicated by the light 22 turning off.

Figure 2:
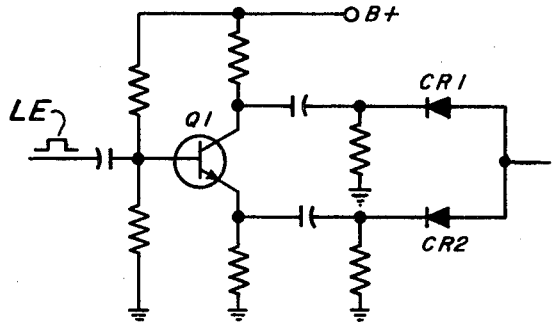
FIG. 2 is a schematic circuit diagram of the zero-crossing detector shown in block form in FIG. 1.

FIG. 2 is a circuit diagram of the zero-crossing detector 10 of FIG. 1. As stated above, the zero-crossing detector 10 receives at its input a pulse train which represents the leading wave signal LE. The output of the detector 10, at the junction of the diodes CR1, CR2 is a series of negative spike pulses which occur at the leading and trailing edges of the square wave input pulses. As stated, these negative spike pulses serve to "set" the input flip-flop 11 to the logical "1" state. The zero-crossing detector 10 operates as follows.

The leading edge of the input LE wave (that is, the point where the wave changes from low voltage to high) causes the collector current of transistor Q1 to increase. At this time, the voltage at the collector drops while the emitter voltage rises. The RC differentiating circuit at the collector produces a negative spike which is of the correct polarity to pass through the diode CR1 to the output. The RC circuit at the emitter produces a positive spike which is blocked by its corresponding diode CR2.

The trailing edge of the LE wave causes the collector current of transistor Q1 to decrease. At this time the voltage at the collector rises while the emitter voltage drops. The emitter RC circuit produces a negative spike which is allowed to go through to the output. The collector RC circuit produces a positive spike which is blocked. In this manner a negative pulse is provided at the circuit output each time the input square wave passes through a transition.

Figure 3:
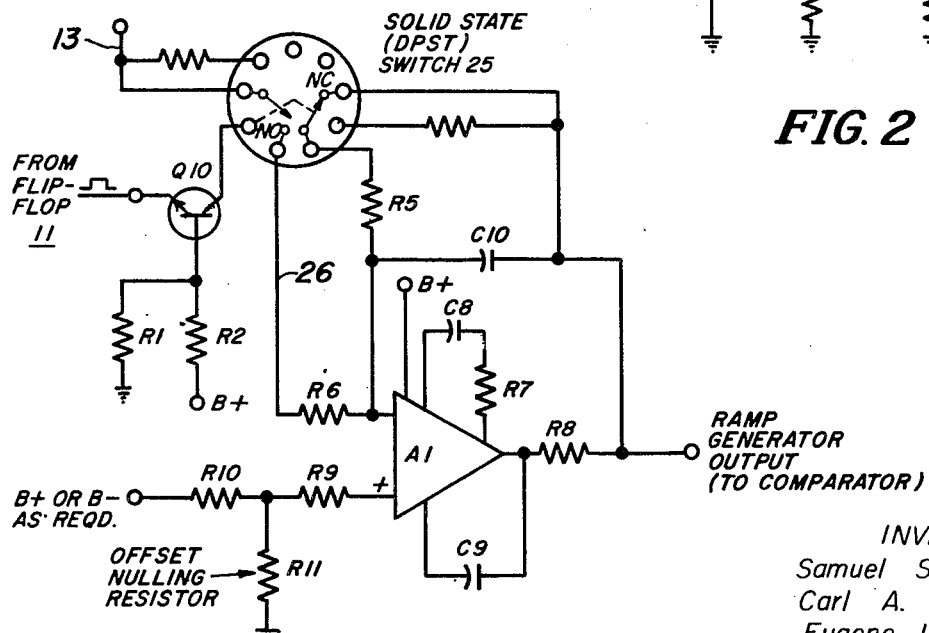
FIG. 3 is a schematic circuit diagram of the ramp generator shown in block form in FIG. 1.

Turning now to FIG. 3, there is shown a circuit diagram comprising the ramp generator 12 of FIG. 1. As shown the ramp generator 12 comprises an integrator built around an operational amplifier A1 and operates in response to a positive rectangular pulse generated by the input flip-flop 11 at its input to generate a negative-going voltage ramp at its output. As in integrator, a summing point is established at the inverting input of the operational amplifier A1. To this summing point an input resistor R6 and feedback capacitor C10 are connected and thus complete an operational amplifier integrator configuration.

The gating of the integrator shown in FIG. 3 is accomplished by means of a solid-state double-pole, single-throw switch (DPST) 25, for example the Amelco 2114BF. The output of switch 25 has two field effect transistors (FET) which operate as a toggle. When one FET is saturated (appearing like a short circuit), the other is cut off (appearing as an open circuit). As indicated in FIG. 3, one of the FETs is connected in series with the input resistor R6. The other FET is in series with resistor R5 which is used to discharge the capacitor C10. Thus, when the input frequency-dependent voltage is gated into the input resistor R6, resistor R5 is disconnected. When the input voltage is disconnected from the input resistor R6, resistor R5 is connected across capacitor C10 creating a discharge.

In the ramp generator configuration of FIG. 3, capacitors C8 and C9 together with the resistor R7 are used exclusively for stabilization of the amplifier A1. Resistor R8 at the output of the amplifier is employed for short circuit protection. The resistor network R connected to the positive input terminal of the amplifier is used for balancing the inputs. More specifically, resistor R9 essentially balances the impedances and the other resistors R10 and R11 establish the required voltage to compensate for offset voltages and currents.

The switch 25 requires compatible gating signals. Hence, transistor Q10 and the associated resistors R1 and R2 achieve the necessary level shifting of the input gating signals. The two resistors R1 and R2 establish a voltage level of approximately +3 volts at the base of the transistor Q10. When the input gating signal from flip-flop 11 is below this level the transistor Q10 is turned on (saturated) and when the input gating signal is above the +3 volts, the transistor cuts off and the collector seeks its own voltage level, as provided by switch 25.

Figure 4:
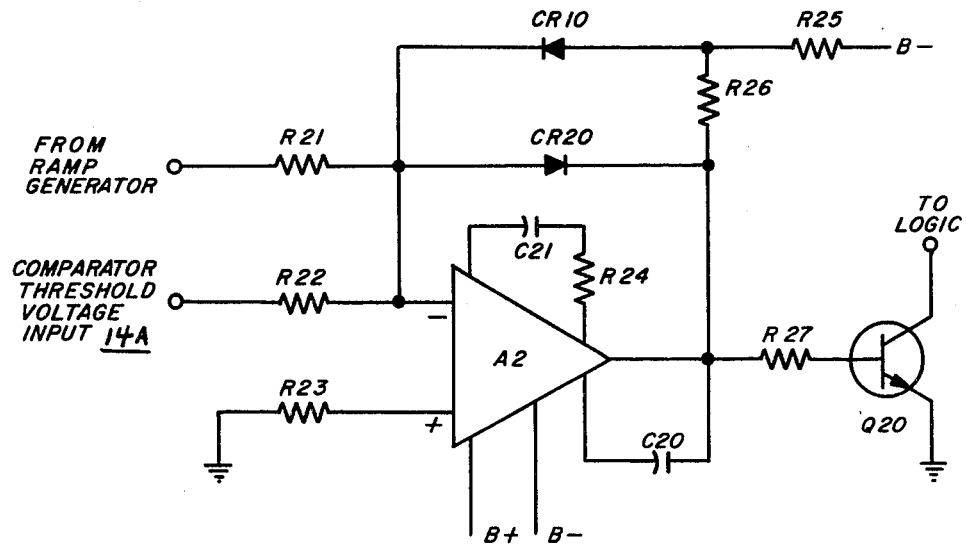
FIG. 4 is a schematic circuit diagram of the comparator shown in block form in FIG. 1.

FIG. 4 is a circuit diagram of the comparator 15 of FIG. 1. As stated, the comparator's function is to generate a control signal once the output of the ramp generator 12 that proceeds it exceeds a specific magnitude. The output of the comparator drives logic elements and, accordingly, it need only present a short circuit to ground or an open circuit depending on the state of the inputs. Consequently, the output of the comparator is made to drive, through a resistor R27, the base of a transistor Q20. The output then appears, as shown, at the collector of this transistor.

The comparator, as shown in FIG. 4, has two input (summing) resistors R21, R22. These resistors are matched and their junction is connected to the inverting input terminal of an operational amplifier A2. The noninverting input terminal is connected to ground through resistors R23 which equals the resistance that is connected to the inverting input. Equating the resistances, the error due to the bias current of the amplifier A2 is minimized.

Two diodes CR10, CR20 are also connected to the summing point. One diode CR20 has its anode at the summing point and its cathode to the amplifier A2 output. This diode prevents the output of the amplifier A2 from going negative which may break down the base-emitter junction of the output transistor Q20. The other diode, CR10 has its cathode connected to the summing point and its anode to the junction of resistors R25, R26. The latter two resistors and the diode form a clamping circuit which limits the output swing of the compensator to approximately +5 volts. At this voltage, the voltage at the junction of resistors R21 and R22 is approximately ground and the diode connected to that point is at the transition point from conduction to nonconduction. Once the diode starts conducting, the output of the operation amplifier A2 remains essentially fixed. By these arrangements with the diodes, the voltage differential across the two inputs of operational amplifier A2 does not exceed 5 volts, the maximum permissible. The remaining components consist of capacitors C20 and C21 which, together with resistor R24, stabilizes the operational amplifier A2. In addition, there is a current limitation resistor R27 which connects the output of the operation amplifier to the base of the output transistor Q20. This transistor is in either of two states, cut off or saturated which in turn is sensed by the following logic elements.

Thus while preferred constructional features of the invention are embodied in the structure illustrated herein, it is to be understood that changes and variations may be made by those skilled in the art without departing from the spirit and scope of the appended claims.

The embodiments of the invention in which an exclusive privilege or property is claimed are defined as follows:

1. In a frequency-independent system for phase aligning a pair of frequency-variable symmetrical voltage wave trains having the same instantaneous frequency, means responsive to each voltage level transition of one of said trains for producing corresponding pulse signals in synchronism with each transition, resettable ramp generator means responsive to each said pulse signal for producing an output voltage ramp signal having a slope proportional to said instantaneous frequency, means for initiating a control signal when said ramp signal reaches a reference voltage level, means responsive to said control signal for resetting said ramp generator means, means responsive to successive control signals for producing a phase-shifted symmetrical output wave train having voltage level transistors synchronized with said control signals, and means for comparing the relative phase of the shifted output wave train with the other of said wave trains.

2. In a system in accordance with claim 1 wherein the last-named means includes means combining said shifted output wave train and the other of said wave trains to provide a pulse train having pulse widths proportional to the relative phase difference between said shifted output wave train and other of said wave trains.

3. In a system in accordance with claim 2 wherein said last-named means further includes means responsive to said pulse train for indicating the incidence of relative phase desynchronization of said shifted output wave train and said other of said wave trains.

4. In a system in accordance with claim 1 wherein said resettable ramp generator means comprises an integrator circuit means in combination with operation amplifier means.